United States Patent
Kiperberg et al.

(10) Patent No.: US 11,269,992 B2
(45) Date of Patent: Mar. 8, 2022

(54) SYSTEMS AND METHODS FOR HYPERVISOR-BASED PROTECTION OF CODE

(71) Applicant: TRULYPROTECT OY, Yehud (IL)

(72) Inventors: Michael Kiperberg, Ashkelon (IL); Raziel Ben Yehuda, Rishon Lezion (IL); Asaf Algawi, Tirat Hacarmel (IL); Roee Shimon Leon, Petach Tikva (IL); Amit Resh, Kfar Yona (IL); Nezer Jacob Zaidenberg, Hod Hasharon (IL)

(*) Notice: Subject to any disclaimer, the term of this patent is extended or adjusted under 35 U.S.C. 154(b) by 0 days.

(21) Appl. No.: 16/980,463

(22) PCT Filed: Mar. 22, 2019

(86) PCT No.: PCT/IB2019/052343
§ 371 (c)(1),
(2) Date: Sep. 14, 2020

(87) PCT Pub. No.: WO2019/180675
PCT Pub. Date: Sep. 26, 2019

(65) Prior Publication Data
US 2021/0049263 A1    Feb. 18, 2021

Related U.S. Application Data

(60) Provisional application No. 62/646,554, filed on Mar. 22, 2018.

(51) Int. Cl.
*G06F 21/53*    (2013.01)
*G06F 12/1009*    (2016.01)
(Continued)

(52) U.S. Cl.
CPC .......... *G06F 21/53* (2013.01); *G06F 12/1009* (2013.01); *G06F 12/1045* (2013.01);
(Continued)

(58) Field of Classification Search
CPC ........ G06F 21/53; G06F 21/54; G06F 21/575; G06F 21/602
(Continued)

(56) References Cited

U.S. PATENT DOCUMENTS 8,127,292 B1 * 2/2012 Dobrovolskiy ......... G06F 21/30
718/1
9,104,327 B2    8/2015 Gorobets et al.
(Continued)

FOREIGN PATENT DOCUMENTS

EP    2169908 A1    3/2010

OTHER PUBLICATIONS

Sgandurra, Daniele, and Emil Lupu. "Evolution of Attacks, Threat Models, and Solutions for Virtualized Systems." ACM computing surveys 48.3 (2016): 1-38. Web. (Year: 2016).*

*Primary Examiner* — Thanhnga B Truong
*Assistant Examiner* — Angela R Holmes
(74) *Attorney, Agent, or Firm* — Alphapatent Associates, Ltd; Daniel J. Swirsky

(57) ABSTRACT

Systems and methods for protecting vulnerable code by obtaining an input file comprising code representing executable files; generating a protected executable file by replacing an unencrypted version of each vulnerable function of the input file with a VM-exit generating instruction; and generating a database file including an encrypted version of each vulnerable function deleted from the input file. The protected executable file, database file are stored on a target device. A UEFI application initializes a hypervisor which accesses the decryption key using a TPM device and loads an operating system. When the hypervisor detects an attempt to execute an encrypted version of a vulnerable function it decrypts the encrypted version of the vulnerable function.

10 Claims, 9 Drawing Sheets

(51) Int. Cl.
*G06F 12/1045* (2016.01)
*G06F 12/14* (2006.01)
*G06F 21/54* (2013.01)
*G06F 21/57* (2013.01)
*G06F 21/60* (2013.01)

(52) U.S. Cl.
CPC .......... *G06F 12/1475* (2013.01); *G06F 21/54* (2013.01); *G06F 21/575* (2013.01); *G06F 21/602* (2013.01)

(58) Field of Classification Search
USPC .......................................................... 726/22
See application file for complete search history.

(56) References Cited

U.S. PATENT DOCUMENTS

| | | | |
|---|---|---|---|
| 9,405,708 B1 | 8/2016 | Pohlack | |
| 2006/0107325 A1* | 5/2006 | Kanestrom | G06F 21/6209 726/26 |
| 2006/0161719 A1* | 7/2006 | Bennett | G06F 12/109 711/6 |
| 2009/0164770 A1* | 6/2009 | Zimmer | G06F 21/51 713/2 |
| 2010/0077066 A1* | 3/2010 | Chawla | G06F 9/4416 709/222 |
| 2013/0031374 A1* | 1/2013 | Thom | G06F 21/46 713/189 |
| 2013/0208893 A1* | 8/2013 | Shablygin | H04L 9/3213 380/277 |
| 2015/0089173 A1* | 3/2015 | Chhabra | G06F 9/45558 711/163 |
| 2017/0242719 A1 | 8/2017 | Tsirkin et al. | |
| 2017/0249002 A1* | 8/2017 | Costa | G06F 13/42 |

\* cited by examiner

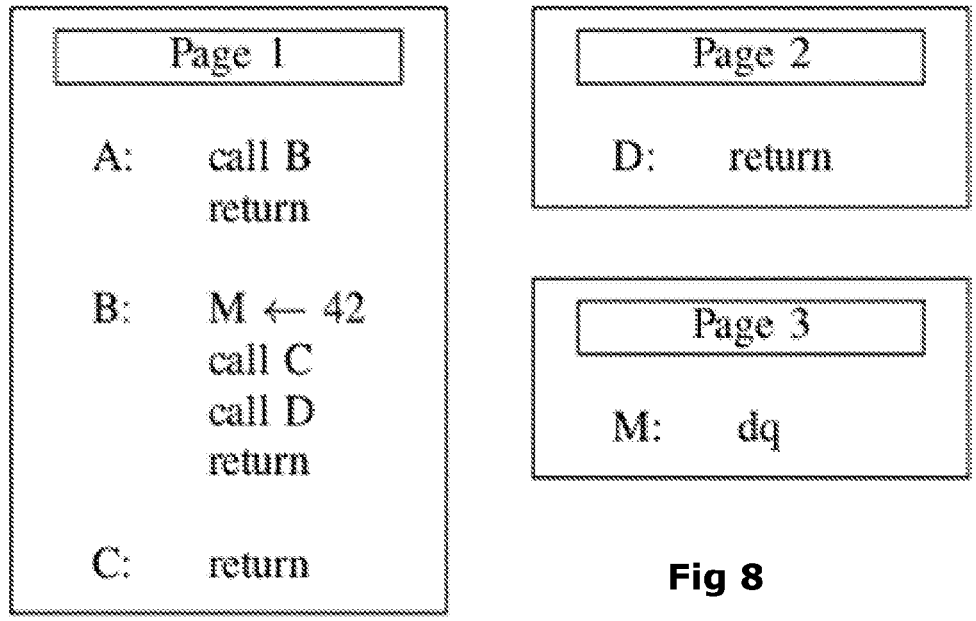

Fig 8

Algorithm 1 Hypervisor's VM-exit handler
1: if #GP and RIP is not in protected function then
2:　Inject and return to guest
3: else if #GP and RIP is in protected function then
4:　while TRUE do
5:　　Enter user-mode at RIP and await interrupts
6:　　if #GP or #PF[INSTR] then
7:　　　if RIP not in protected function then
8:　　　　Return to guest
9:　　　if RIP is not mapped then
10:　　　　Allocate a safe page & fill it with HLTs
11:　　　　Map the page to RIP
12:　　　　Decrypt function at RIP
13:　　　else if #PF[DATA] and mapped in guest then
14:　　　　Copy mapping
15:　　　else
16:　　　　Inject and return to guest
17: else if INVLPG then
18:　Clear virtual table
19:　Return to guest

Algorithm 2 UEFI Application Initialization Sequence

1: if FileExists("key.bin") then
2:     $EncryptedKey \leftarrow$ FileRead("key.bin")
3:     $Key \leftarrow$ Unseal($EncryptedKey$)
4: else
5:     $Key \leftarrow$ Input()
6:     $EncryptedKey \leftarrow$ Seal($Key$)
7:     FileWrite("key.bin", $EncryptedKey$)
8: Extend(0)

SYSTEMS AND METHODS FOR HYPERVISOR-BASED PROTECTION OF CODE

CROSS-REFERENCE TO RELATED APPLICATIONS

This application is a U.S. National Phase Application under 35 U.S.C. 371 of International Application No. PCT/IB2019/052343, which has an international filing date of Mar. 22, 2019, and which claims priority and benefit from U.S. Provisional Patent Application No. 62/646,554, filed Mar. 22, 2018, the contents and disclosure of which are incorporated herein by reference in their entirety.

FIELD OF THE DISCLOSURE

The disclosure herein relates to systems and methods for protecting compiled code susceptible to reverse-engineering attacks. In particular the disclosure relates to preventing theft and tampering of code using a hypervisor initiated by a UEFI application and responsible for decryption, execution and protection of the encrypted functions.

BACKGROUND

A compiled program is susceptible to two types of attacks: theft and tampering. The main countermeasure against these attacks is obfuscation, which can be defined as a transformation that produces a more complex program but which has the same observable behavior. Several taxonomies classify the different obfuscation methods by the abstraction level (source code, machine code), the unit (instruction, function, program), or the target (data, code) of the performed transformation. According to this classification, the abstraction level of our method is machine code, its unit of transformation is function, and it mainly targets code. Specifically our method does not protect variables, the stack or any other information that does not reside within a function.

There is a wide range of approaches to code protection. The simplest forms of code protection are:
  instruction reordering, in which independent instructions of the original program are permuted
  instruction substitution, in which sequences of instructions are replaced by other but equivalent sequences
  garbage insertion, in which the transformation inserts new sequences of instructions that do not affect the execution of the program
  dead code insertion, in which the transformation inserts new sequences of instructions that are never executed
  All these methods are vulnerable to automatic attacks.

A more sophisticated method of code protection is encoding, which either encrypts or compresses portions of the original program and decodes these portions back prior to their execution. However, even when an encryption is used, the cryptographic key is embedded in the decryption algorithms, and therefore can be extracted. Moreover, since the code eventually must be decrypted, it can be extracted during run-time. Therefore, such methods are usually combined with run-time analysis prevention methods.

A particular case of encoding is virtualization, in which the program is translated into a different instruction set, then executed by a special embedded interpreter. Automatic and semi-automatic attacks have been proposed for this method.

The performance degradation due to obfuscation depends on the sophistication of the obfuscation method. For example, the Obfuscator-LLVM specifies which obfuscation techniques should be applied to an executable. When only instruction substitution is applied, the performance penalty is about 4% on average. However, when additional techniques are added, e.g. bogus control flow, control flow flattering, function annotations, etc., the execution times increase by a factor of 15-35. Stunnix and Tigress produce executables that are slower by a factor of about 9.

Thus, the need remains for a system and method for secure encryption of vulnerable code. The invention described herein addresses the above-described needs.

SUMMARY OF THE EMBODIMENTS

It is one aspect of the current disclosure to teach a method for protecting computer code. The method may include: obtaining an input file comprising code representing executable files including at least one vulnerable function selected to be encrypted; encrypting each the at least one vulnerable function; replacing an unencrypted version of each the at least one vulnerable function of the input file with a VM-exit generating instruction, thereby generating a protected executable file; generating a database file including an encrypted version of each the at least one vulnerable function.

Accordingly, the method may further include: sending the protected executable file to a target device; sending the database file to the target device; and sending the decryption key to the target device. Optionally, the decryption key comprises a symmetric cryptographic key.

It is another aspect of the current disclosure to teach a method for executing the protected computer code. The method may include: obtaining a protected executable file comprising code representing executable files and VM-exit generating instructions; obtaining a database file comprising an encrypted version of at least one vulnerable function; obtaining a decryption key, the decryption key characterized by being accessible to only a first requesting function; storing the decryption key on a local memory of a target device; storing the database file on a local memory of the target device.

Accordingly the method may further include the target machine executing a UEFI application on the target device: the UEFI application initializing a hypervisor; the hypervisor accessing the decryption key; the UEFI application loading an operating system of the target device; the operating system executing the executable files; the hypervisor detecting an attempt to execute an encrypted version of a vulnerable function; the hypervisor decrypting the encrypted version of the vulnerable function; the hypervisor protecting a decrypted version of the vulnerable function; the hypervisor executing the vulnerable function; and the hypervisor deleting the decrypted version of the vulnerable function.

Optionally, the step of storing a decryption key on a local memory of the target device, may comprise sealing the encryption code by encrypting the decryption key using a trusted platform module (TPM). Accordingly, the step of the hypervisor accessing the decryption key may comprise the TPM unsealing the decryption key. Additionally or alternatively, the step of the TPM unsealing the decryption key further comprises the TPM transitioning to an inaccessible state such that the decryption key is indecipherable. Optionally, the method includes the UEFI application communicating with the TPM over a secure channel.

Where appropriate, the step of executing the UEFI application on the target device may include: allocating at least one persistent memory block; setting up secondary level address translation table mapping apparent operating system perceived addresses to real physical addresses; and setting up an input-output memory management unit mapping apparent hardware device perceived system addresses to real physical addresses.

Accordingly, the method may further include the secondary level address translation table mapping the hypervisor address space and the operating system address space to different groups of cache sets. Additionally or alternatively, the method may further include the input-output memory management unit mapping the hypervisor address space and the operating system address space to different groups of cache sets. Optionally, the method may further include the secondary level address translation table assigning access rights to the real physical addresses. Furthermore, the method may further include the input-output memory management unit assigning access rights to the real physical addresses. Optionally, the secondary level address translation table comprises an extended page table.

Variously, the method may include the decrypted version of the vulnerable function requesting additional pages; and the hypervisor mapping the additional pages.

Where appropriate, the step of the hypervisor detecting an attempt to execute an encrypted version of a vulnerable function may include: the hypervisor examining the operating system data structures; and the hypervisor determining that an instruction pointer resides in a protected function. Accordingly, the step of the hypervisor examining the operating system data structures includes: finding a base address at which the protected program was loaded; calculating an offset of the instruction pointer from the base address; and searching the database for a function with the calculated offset.

Additionally or alternatively, the method may further include: the hypervisor profiling the functions; and the hypervisor selecting a set of functions to be encrypted such that the code is executed efficiently.

Accordingly, the hypervisor may recommend the set of functions to be encrypted.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIG. 8 is a block diagram illustrating a sample program consisting of four functions (A, B, C, D) and of one variable (M);

FIG. 9 indicates a possible case handling algorithm for use in the method described herein;

DETAILED DESCRIPTION

Figure 1:
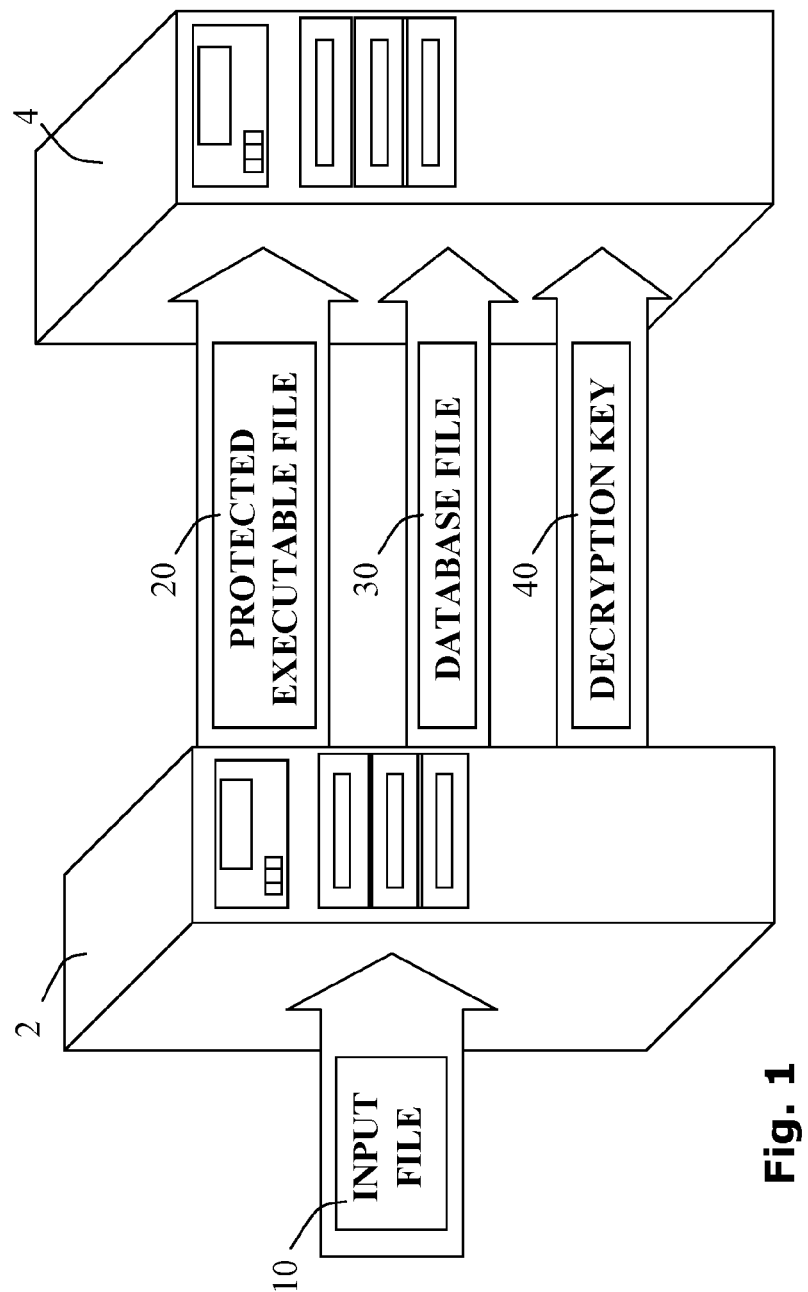
FIG. 1 is a schematic diagram illustrating the main elements of an embodiment of a system for encoding compiled code and delivering the code to a client terminal.

Aspects of the present disclosure relate to system and methods for protecting compiled code susceptible to reverse-engineering attacks.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally, or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

A set of extensions to a basic instruction set architecture, such as a Virtual Machine Extension (VMX) or the like may be used to enable a processor to execute multiple operating systems simultaneously. The software that governs the execution of the operating systems is called a hypervisor and each operating system (with the processes it executes) is called a guest. Transitions from the hypervisor to the guest are called VM-entries and transitions from the guest to the hypervisor are called VM-exits. While VM-entries occur voluntarily by the hypervisor, VM-exits are caused by some event that occurs during the guest's execution. The events may be synchronous, e.g. execution of an INVLPG instruction, or asynchronous, e.g. page-fault or general-protection exception. The event that causes a VM-exit is recorded for future use by the hypervisor. A special data structure called Virtual Machine Control Structure (VMCS) allows the hypervisor to specify the events that should trigger a VM-exit, as well as many other settings of the guest.

An Extended Page Table (EPT) or other such Secondary Level Address Translation (SLAT) technology, allows the hypervisor to configure a mapping between the physical address space, as it is perceived by a guest, to the real physical address space. Similarly to the virtual page table, EPT allows the hypervisor to specify the access rights for each guest physical page. When a guest attempts to access a page that is either not mapped or has inappropriate access rights, an event called EPT-violation occurs triggering a VM-exit.

Input-Output Memory Management Unit (IOMMU) allows the hypervisor to specify the mapping of the physical address space as perceived by the hardware devices to the real physical address space. It is a complementary technology to the EPT that allows a construction of a coherent guest physical address space for both the operating system and the devices.

The system described herein includes an Unified Extensible Firmware Interface (UEFI) application and an encryption tool. The encryption tool allows the distributor to encrypt a set of selected functions in a given program. The UEFI application initializes a hypervisor that enables the execution of encrypted functions by running the operating system (and all its processes) as a guest. An encrypted program starts executing as usual but whenever it jumps to an encrypted function, a VM-exit occurs. The hypervisor decrypts the function and executes the decrypted function in user-mode (in the context of the hypervisor). When the function returns, the hypervisor performs a VM-entry and the normal program execution continues.

The UEFI application uses the (Trusted Platform Module) TPM to unseal the decryption key, which is stored (in its sealed form) in a local file. After activating the hypervisor the (unsealed) key is delivered to the hypervisor through a secure communication channel. The configuration of EPT and IOMMU does not map the pages that contain the key and the decrypted functions, making them inaccessible both from the guest and from a hardware device.

It is noted that the system described herein may be able to withstand the various attacks such as malicious code executing in user-mode or kernel-mode; malicious hardware devices connected via a DMA controller equipped with IOMMU; and sniffing on any bus. The system ensures that even under all of these attacks, the attacker is unable to obtain the decryption key or the decrypted functions provided that the firmware, including the code that executes in SMM is trustworthy.

Referring to the schematic diagram of FIG. 1, an encryption machine 2 may receive an input file 10 including the vulnerable code to be protected, An encryption tool may process the input file 10 thereby producing a protected executable file 20, a database file 30 and a database file 40 which are sent to a target machine 4 upon which they are installed.

Figure 2:
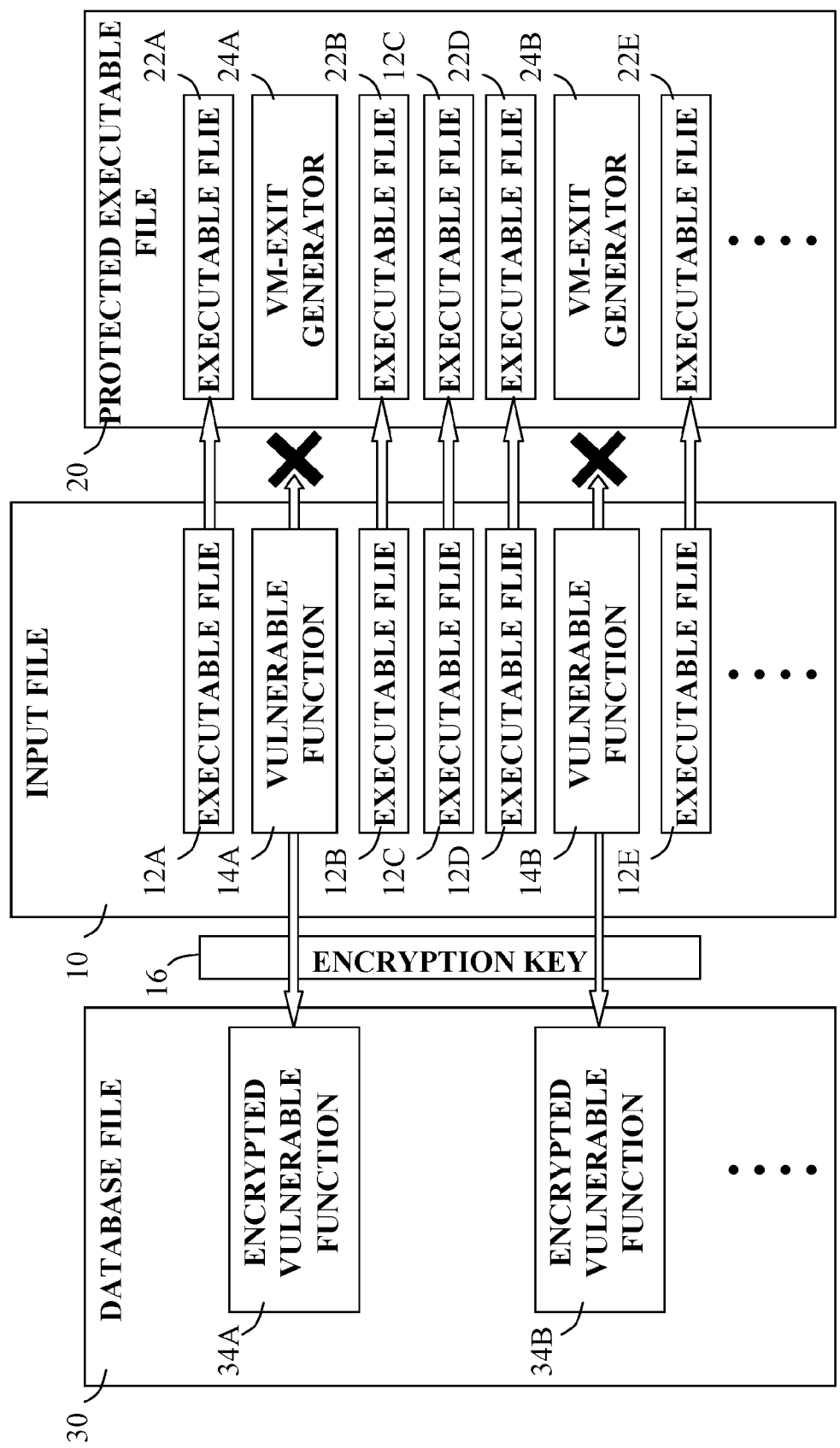
FIG. 2 is a schematic diagram representing how a protected executable file and a database file may be prepared from an input file according to an embodiment of the current method.

It is noted that encryption is performed in a granularity of a function. Referring now to FIG. 2, the encryption tool receives as input a text file 10 that specifies the executable files 12A-E (collectively 12) and the vulnerable functions 14A-B (collectively 14) to be encrypted as well as the encryption key 16 to be used.

The encryption tool produces a database file 30 that contains the encrypted versions 34A-B of all the vulnerable functions 14A-B selected for encryption.

In addition to the generation of the database file 30, the encryption tool "erases" the instructions of the selected functions. The erasing of code is performed by replacing the original instructions 14A-B by a special instruction 24A-B (collectively 24), typically VM-EXIT generating instructions. Accordingly a protected executable file 20 is prepared.

The VM-EXIT generating instructions 24 may be for example an HLT instruction. When executed in kernel mode, the HLT instruction causes the processor to halt. In user mode however, this instruction generates a general protection exception, which can be intercepted by the hypervisor. It is noted however that any instruction that generates an exception can additionally or alternatively by used a special instruction for this purpose. By way of example, the INT3 instruction generates a breakpoint exception and therefore can be used to replace the functions' original instructions.

The encryption tool may be implemented as a command line program. It can be invoked from a standard makefile rule or as a post-build action, thus allowing the distributor to automate the encryption process.

Figure 3:
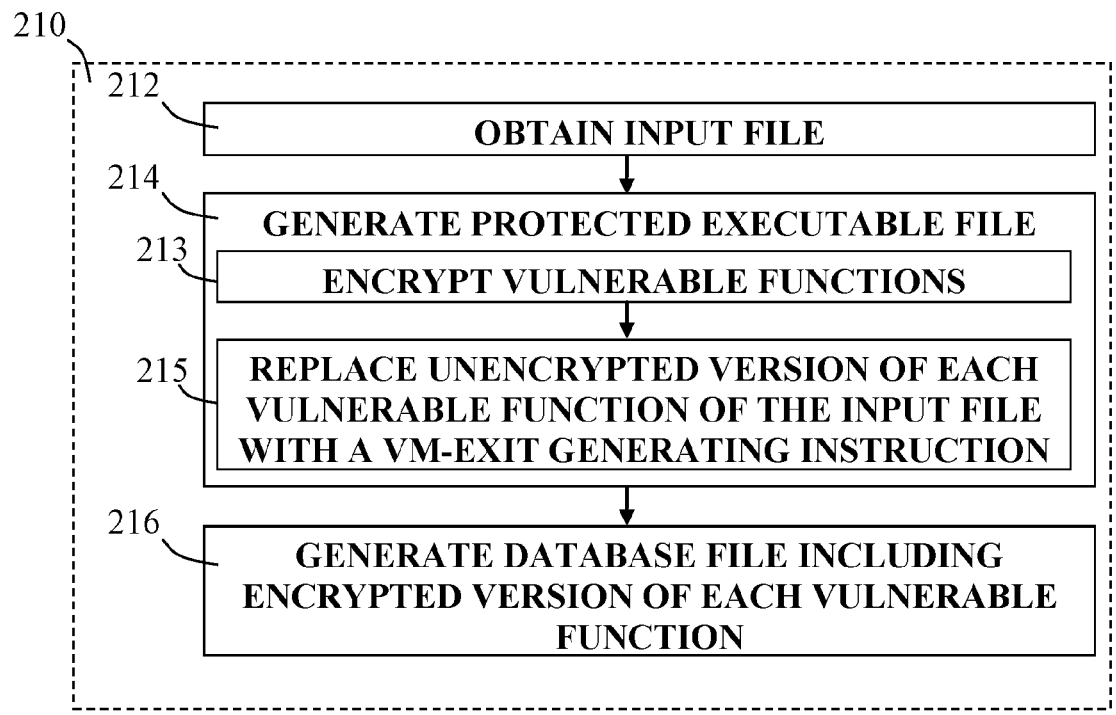
FIG. 3 is a flowchart illustrating the main steps in a possible method for encrypting compiled code.

Referring now to the flowchart of FIG. 3, a method 210 is taught for protecting computer code including: obtaining an input file comprising code representing executable files including at least one vulnerable function selected to be encrypted; 212; generating a protected executable file 214, typically by encrypting each vulnerable function 213 and replacing an unencrypted version of each said at least one vulnerable function of the input file with a VM-exit generating instruction 215; and generating a database file including an encrypted version of each vulnerable function deleted from the input file 216.

In UEFI enabled systems, after a successful initialization, the firmware loads a sequence of executable images, called UEFI applications. The sequence is stored in a firmware-defined non-volatile storage. Each element in the sequence points to a location that contains an UEFI application. After loading an UEFI application to the memory, the firmware calls the application's main function. If the main function returns, the firmware loads the next application and so on. Typically, the operating system's boot loader is implemented as an UEFI application, whose main function does not return. The firmware settings screen allows the boot sequence to be configured.

As required, the system described in this paper may be implemented as a UEFI application. In order to install the system, the distributor should perform the following steps: The UEFI application is placed in a location accessible by the firmware such as a local disk, USB device, TFTP server or the like; the boot sequence is modified so that the application is pointed by the first element of the boot sequence; and the code decryption key is stored by performing the boot process.

During its first execution, the application asks the user to enter the code decryption key. Then, the application encrypts the key using a TPM, a process called sealing, and stores the resulting encrypted key in a local file.

During subsequent executions, the application reads the file and decrypts its contents using the TPM, thus obtaining the code decryption key. The application configures the TPM to reject further attempts to obtain the code such that it is impossible for another UEFI application to obtain the code decryption key.

The distributor should store the database file, which was produced during the encryption phase, on a local drive that is accessible by the firmware. We recommend the use of the ESP (EFI System Partition). The ESP can be mounted and become a regular folder, which simplifies updates of the configuration file after the initial provisioning.

Figure 4:
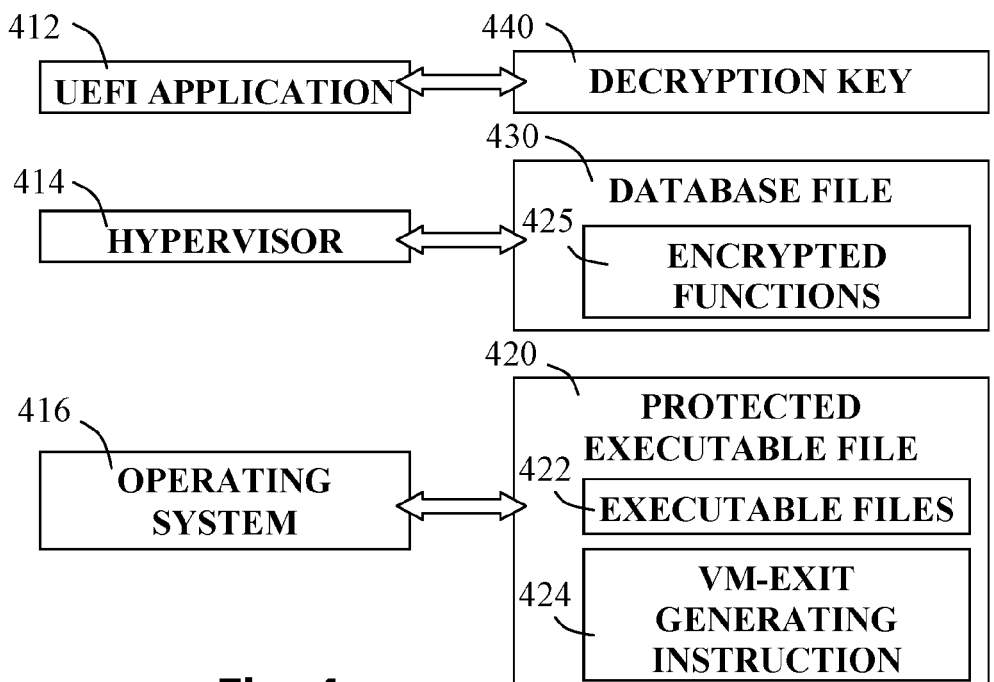
FIG. 4 is a schematic diagram representing the architecture of a client machine executing protected code according to an embodiment of the current method.

Referring now to FIG. 4, the UEFI application 412, during its execution, obtains the code decryption key 440 using the TPM, loads the database file 430, initializes a hypervisor 414, and returns to firmware. The firmware typically proceeds by loading the operating system 416 boot loader. The hypervisor 414 remains in the main memory and continues its operation even after the application 412 terminates.

The operating system 416 accesses the protected executable file 420 and executes the executable executable files 422. The hypervisor 414 is responsible for detecting attempts to execute encrypted functions (whose instruction were replaced by a special instruction 424). When such an attempt is detected, the hypervisor 414 accesses the database file 430, decrypts the function 425, and executes it on behalf of the original program. During this execution, the hypervisor protects the decrypted version of the function from being exposed.

Figure 5:
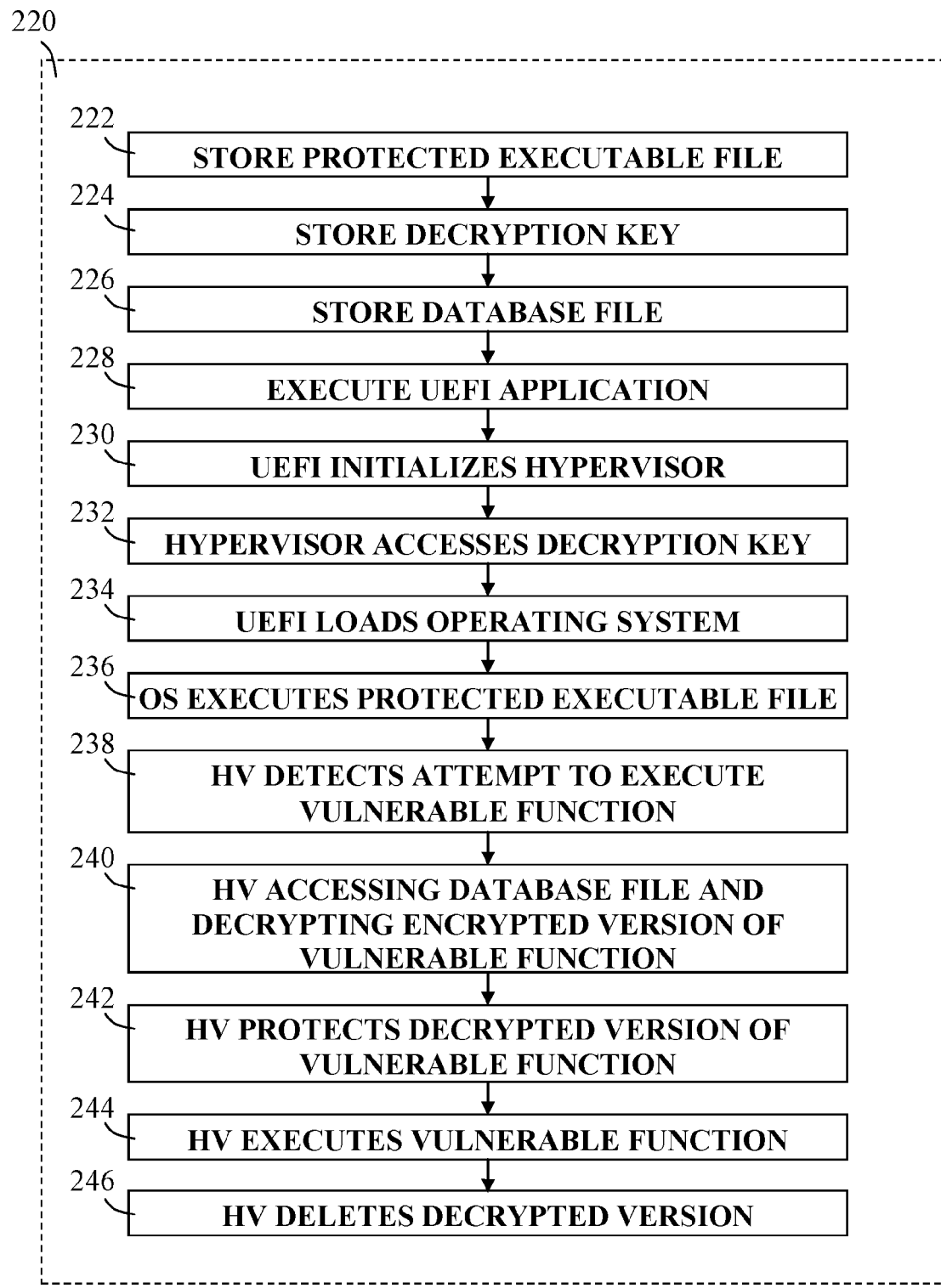
FIG. 5 is a flowchart illustrating the main steps in a possible method for executing protected code according to another aspect of the current method.

Accordingly, referring now to the flowchart of FIG. 5 a method 220 is taught for protecting computer code during execution on a local machine. The method comprises: storing a protected executable file comprising code representing executable files and VM-exit generating instructions 222; storing a decryption key, which is only accessible to the first requesting function; 224 storing a database file comprising an encrypted version of at least one vulnerable function 226; executing a UEFI application on said target device 228; the UEFI application initializing a hypervisor 230; the hypervisor accessing said decryption key 232; the UEFI application loading an operating system of said target device 234; the operating system executing said executable files 236; the hypervisor detecting an attempt to execute an encrypted version of a vulnerable function 238; the hypervisor accessing the database file and decrypting the encrypted version of the vulnerable function 240; the hypervisor protecting a decrypted version of the vulnerable function 242; the hypervisor executing said vulnerable function 244; and the hypervisor deleting said decrypted version of said vulnerable function 246.

A more detailed explanation of the initialization and the operation of the system follows.

The UEFI application may start by allocating a persistent memory block (a memory block that can be used after the application terminates), and loading the database file into this memory block.

The UEFI application loads the encrypted key from a file and decrypts it, typically using the TPM. The communication with the TPM is carried over a secure channel, thus eliminating man-in-the-middle attacks. When the decryption is completed, the application forces the TPM to transit to a state in which it is no longer possible to decrypt the key file.

The UEFI application may then allocate a persistent memory block, and initializes a hypervisor. During the hypervisor's initialization, the EPT and IOMMU are set up. The EPT defines a mapping between physical addresses as perceived by the operating system, and the real physical addresses. In this sense, EPT is similar to the page tables that map virtual addresses to physical addresses. For this reason, EPT is called a secondary level address translation (SLAT). IOMMU defines a mapping between physical addresses as perceived by hardware devices and the real physical addresses. Both EPT and IOMMU define not only the mapping of the perceived addresses but also their access rights.

Figure 6:
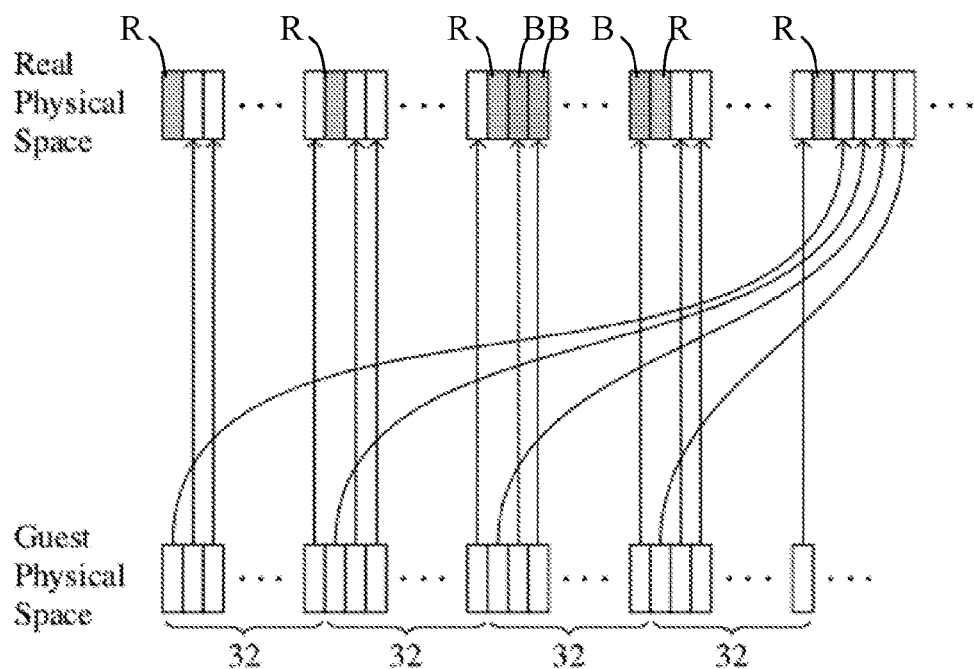
FIG. 6 is a block diagram schematically representing the mapping of guest physical pages to real physical pages.

Referring now to FIG. 6 a block diagram is presented which schematically represents the mapping of guest physical pages (bottom) to real physical pages (top). Real physical pages whose index is a multiple of 32 (labeled R) are safe pages, which are used exclusively by the hypervisor. The guest's physical pages whose index is a multiple of 32 are mapped to the last pages in the real physical address space. The code and the data of the hypervisor (labeled B) are mapped as read-only to the guest physical address space.

The mapping that the hypervisor establishes during its initialization has two goals. The first goal is to protect the hypervisor's code and data from malicious modification. This goal is achieved by setting the access rights of the hypervisor's code and data to be read-only. The second goal is protection of decrypted code from cache eviction attacks. It is noted that this goal is achieved by a technique called page-coloring. In essence, this technique allows the reservation of some portion of the processor's cache to be used exclusively by the hypervisor. This reservation is performed by excluding all pages whose index is a multiple of 32 from the mapping. Thus, the portion of the cache that backs those pages cannot be affected by malicious code executing inside the guest.

Before establishing the new mapping, the hypervisor copies the contents of pages whose index is a multiple of 32 to the pages that correspond to them in the mapping. In order to understand the necessity of this step, consider the following scenario. The firmware stores some value in page 32 before the hypervisor's initialization, and loads this value from page 32 after the initialization. Let us assume that page 32 is mapped to page 10032. The first access will store some value to physical page 32. The second access however will load the value from page 10032. Therefore, the contents of page 32 must be copied to page 10032. The hypervisor uses the pages whose indexes are a multiple of 32 to store sensitive information, like the code of decrypted functions and the decryption key. That is why we call these pages safe pages.

A protected executable can run as usual without any interference while only functions that were not selected for encryption are called. The hypervisor silently waits for an encrypted function to be called. Recall that the encryption tool replaces the original instructions of a function that was selected for encryption by a special instruction that generates an exception. The hypervisor is configured to intercept that specific kind of exception, namely the general protection exceptions. When such an exception is generated, a VM-exit occurs. The processor saves the guest's state to VMCS, loads the hypervisor's state from VMCS, and begins execution of the hypervisor's defined VM-exit handler. The handler checks whether the general protection exception was caused by execution of an encrypted function. If not, the hypervisor injects the exception to the guest, thus delegating the exception handling to the operating system. If the hypervisor detects an attempt to execute an encrypted function, it locates, in the database, the encrypted version of this function, which was loaded during the hypervisor's initialization. Then, the hypervisor decrypts the function to one or more safe pages. Finally, the hypervisor makes some preparations and jumps to the decrypted function.

Figure 7:
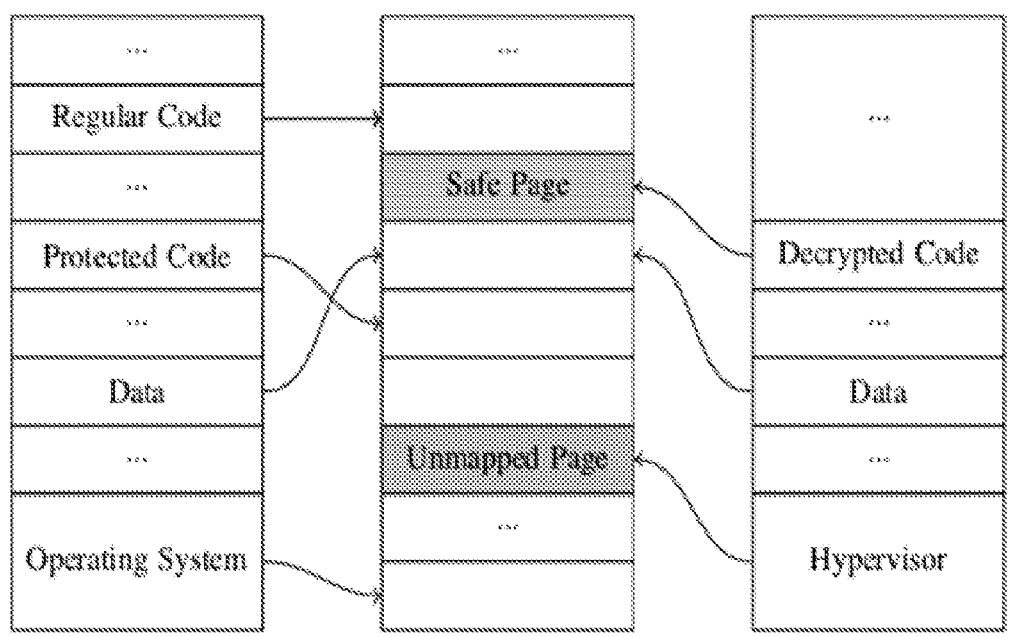
FIG. 7 is a block diagram schematically representing the virtual address space layouts of the hypervisor and the guest during protected function execution.

Referring now to FIG. 7, a block diagram is presented representing the virtual address space layouts of the hypervisor and the guest during protected function execution. The code and the data structures of the hypervisor are not mapped in the guest. The protected code is decrypted to a safe page. The virtual address of the protected function in the hypervisor corresponds to its virtual address in the guest. The mapping of the pages that store data are identical in the hypervisor and the guest. The code of the operating system is not mapped in the hypervisor.

Referring now to FIG. 8 illustrating a sample program consisting of four functions (A, B, C, D) and of one variable (M). The functions A, B and C reside in the first page. The function D resides in the second page. The variable M resides in the third page. In this program only the function B is encrypted.

In order to understand the nature of the preparations that were mentioned in the previous paragraph, we shall discuss the virtual address space of the hypervisor. FIG. 7 illustrates the virtual address space layouts of the hypervisor and the guest. In the x86-64 instruction set, code and memory accesses are instruction-relative. This means that the same sequence of instructions will give different results if executed from different virtual addresses. Therefore, it is highly important to execute the decrypted functions from their natural virtual addresses. Usually operating systems divide the virtual address space into two large regions. In 64-bit Windows, the upper half of the 64-bit space contains the code and data of the kernel, while the lower half contains the code and data of a process. The hypervisor mimics this behavior by holding its code and data in the upper half of its virtual address space; the lower half is reserved for decrypted functions and their data. Whenever the hypervisor decrypts a function to a safe page, it maps this safe page such that the virtual address of the decrypted function equals to the virtual address of the protected function. Finally, the hypervisor transitions to user-mode (under context of the hypervisor) and jumps to the decrypted function. (These two operations are performed by a single IRET instruction).

The execution of the decrypted function continues until it generates an exception. The hypervisor can handle some exceptions; others are injected to the operating system. During its execution, a decrypted function, can attempt to read from, or write to, a page that is not mapped in the hypervisor's virtual address space. In such a case, the hypervisor will copy the corresponding mapping from the operating system's virtual address space. When the decrypted function completes and the hypervisor returns to the guest, the mappings that were constructed are retained for future invocations of that function. However, the operating system is free to reorganize its mappings (e.g. due to paging), thus making the hypervisor's mapping invalid. The handling of different cases is described in Algorithm 1, as presented in FIG. 9.

The algorithm sketches the implementation of the hypervisor's VM-exit handler. Each VM-exit is caused by some condition that occurred in the guest (or during the guest's execution). The main condition that the hypervisor intercepts is a general protection exception. General protection exceptions can occur either due to execution of a HLT instruction or for some other reason. The hypervisor should provide a special handling only for the first case (lines 3-20); in the second case, the hypervisor should inject the exception to the operating system (lines 1-2).

The hypervisor reacts to a special instruction-induced general protection exception by entering a loop (line 4-20). At the beginning of each iteration (line 5), the hypervisor transitions to user-mode (without returning to guest) and sets the instruction pointer to the same address that generated the general protection exception. The execution continues until an exception occurs in user-mode. The handling of different exceptions is demonstrated by an example (see FIG. 8), and the algorithm is described line-by-line.

Referring again to FIG. 8, consider a program that contains 4 functions A, B, C, D and a variable M, that are stored in three memory pages: the first page contains the functions A, B and C, the second page contains the function D, and the third page contains the variable M. The functions are implemented as follows: A calls B and returns, C and D return immediately, B accesses the variable M, calls C, calls D and returns. We now dissect the execution of this program under the assumption that the function B is encrypted and that the page containing M is not mapped in the operating system.

The function A executes normally and calls B. The function B attempts to execute HLT. A VM-exit occurs and the hypervisor enters user-mode (line 5). Since the page containing B is not mapped in the hypervisor, a page-fault occurs. The error code of this page-fault indicates that it was caused by an instruction fetch (denoted by #PF[INSTR] on line 6). The instruction pointer is in a protected function (the condition on line 7 does not hold) but the address is not mapped in the hypervisor (the condition on line 10 does hold), therefore the hypervisor allocates a safe page (which is a physical page), fills it with HLTs, and maps it to the (virtual) page containing B. Finally, the hypervisor locates the entry corresponding to B in the database, and decrypts it.

The loop continues. The hypervisor enters user-mode. The function B accesses the variable M, which is not mapped in the hypervisor. A page-fault exception occurs. The error code indicates data access (denoted by #PF[DATA] on line 15). According to our assumption, the page that contains the variable M is not mapped in the guest. Therefore, the hypervisor injects the exception to the guest (line 18).

The guest operating system maps the page that contains the variable M, and resumes the execution of the function B. However, from the guest's perspective B still contains HLTs, and its execution causes a VM-exit.

The hypervisor enters user-mode (line 5), which immediately generates a page-fault exception, since the page that contains the variable M is still not mapped in the hypervisor. The hypervisor copies the mapping from the guest (line 16) and the loop continues.

The hypervisor enters user-mode (line 5). The function B continues its execution and calls the function C, which resides with B in the same page. This page was filled with HLTs during its allocation. A general-protection exception occurs (line 6). Since the instruction pointer is not in a protected function (line 7), the hypervisor returns to the guest.

The function C executes as usual in the guest and then returns to B, which is filled with HLTs from the perspective of the guest. A VM-exit occurs. The hypervisor enters user-mode and the execution of B continues, until it calls D. Since the page containing D is not mapped, a page-fault exception occurs. The error code indicates instruction fetch (denoted by #PF[INSTR] on line 6). The instruction pointer is not in a protected function (the condition on line 7 holds), therefore the hypervisor returns to the guest.

The function D executes as usual in the guest and then returns to B. A VM-exit occurs. The hypervisor enters user-mode (line 5). The function B continues and eventually returns to A. From the hypervisor's perspective the function A is filled with HLTs. A general-protection exception occurs. Since the instruction pointer is not in a protected function, the hypervisor returns to the guest (line 8).

The algorithm begins by checking the reason for the VM-exit. If the VM-exit is due to a general-protection exception that was not caused by a HLT, the hypervisor injects this exception to the guest (line 2). If the VM-exit is due to execution of a protected function, the hypervisor begins a loop. At the beginning of each iteration, the hypervisor attempts to execute the protected function. Eventually the execution generates an exception. The hypervisor checks the type of the generated exception.

If it is either a general-protection exception, which is generated by jumping to an unknown location (which does not contain a decrypted function) in a safe page, or a page-fault exception caused by an instruction fetch, the hypervisor checks whether the instruction pointer resides in a protected function. If the instruction pointer is not in a protected function, the hypervisor returns to the guest (line 8), in order to continue the execution there. If the instruction pointer is in a protected function, it is possible that the page containing this function is not yet mapped in the hypervisor. In such case, the hypervisor allocates a safe page and fills it with HLTs. The filling guarantees that any jump outside a decrypted function generates an exception. Finally, the hypervisor decrypts the protected function.

If the exception type is a page-fault caused by data access and this data is mapped in the guest, then the hypervisor copies the mapping from the guest (line 16). If, however, the data is not mapped in the guest, then the hypervisor injects the exception to the guest, thus requesting the operating system to map the accessed data.

During execution of regular functions or handling of interrupts and exceptions, the operating system may modify the mappings of virtual pages. The hypervisor may have copies of some of these mappings, which were modified by the operating system. Thus, it is essential for the hypervisor to intercept all such modifications. Since the processor stores portions of mapping information in its caches (TLBs), the operating system is required to inform the processor of all modifications through a special instruction, INVLPG. The hypervisor intercepts this instruction, and responds to it by erasing all the entries that were copied from the operating system (line 22).

Figure 10:
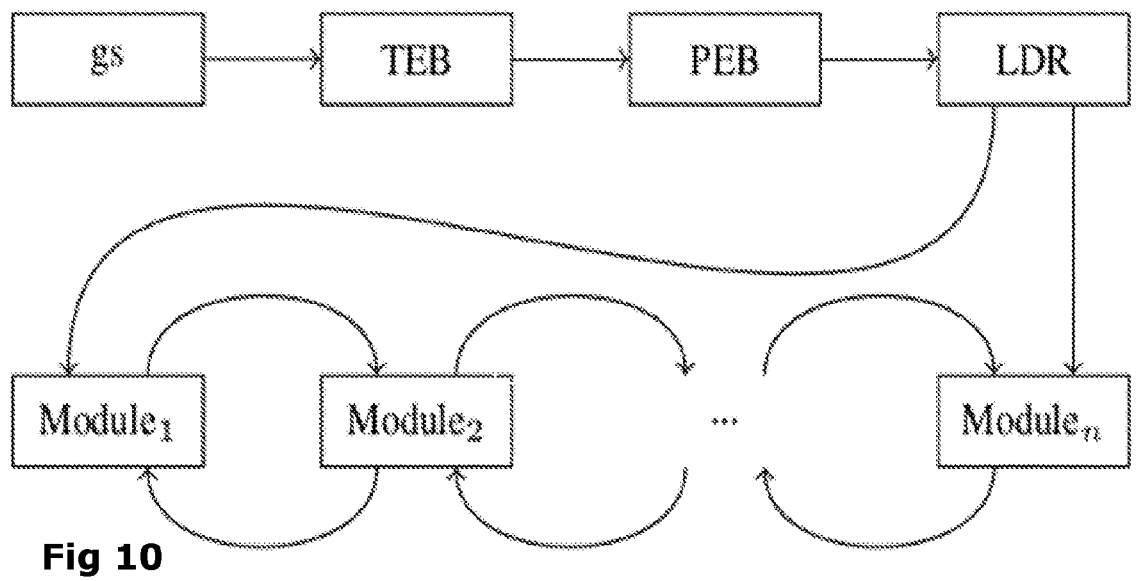
FIG. 10 is a block diagram schematically representing the path to the executable images of the current process.

Referring now to the block diagram of FIG. 10 schematically representing the path to the executable images of the current process, a special register "gs" points to a data structure that describes the current thread (TEB). The TEB data structure points to a data structure that describes the current process (PEB). The PEB data structure points to a data structure that represents a linked list of all the modules (programs and libraries) loaded by the current process.

During some VM-exits the hypervisor needs to check whether the instruction pointer resides in a protected function (line 7). The check is performed in three steps: Firstly, the hypervisor finds the so called base address—the address at which the protected program was loaded; then, the hypervisor calculates the offset of the instruction pointer from the base address; finally, the hypervisor searches for a function with the calculated offset in the database FIG. 10 is a block diagram schematically representing the path to the executable images of the current process.

In order to find the base address, the hypervisor uses the operating system's data structures. In some systems, such as Windows for example, the segment register gs points to a data structure called the Thread Environment Block (TEB), which reflects information about the currently executing thread. The TEB contains a field that points to a data structure called the Process Environment Block (PEB), which reflects information about the currently executing process. The PEB contains a field that points to a data structure (LDR) that represents a linked list of all executable images (programs and libraries) loaded by the process. Each entry in this linked list contains the name of the image, its base and its size, thus allowing us to find an image that contains a specific address. Some of these data structures may be paged-out by the operating system from the main memory to the disk. Therefore, the hypervisor may need to force the operating system to load these data structures to the main memory. This is done, by injecting artificial page-fault exceptions to the guest.

Figure 11:
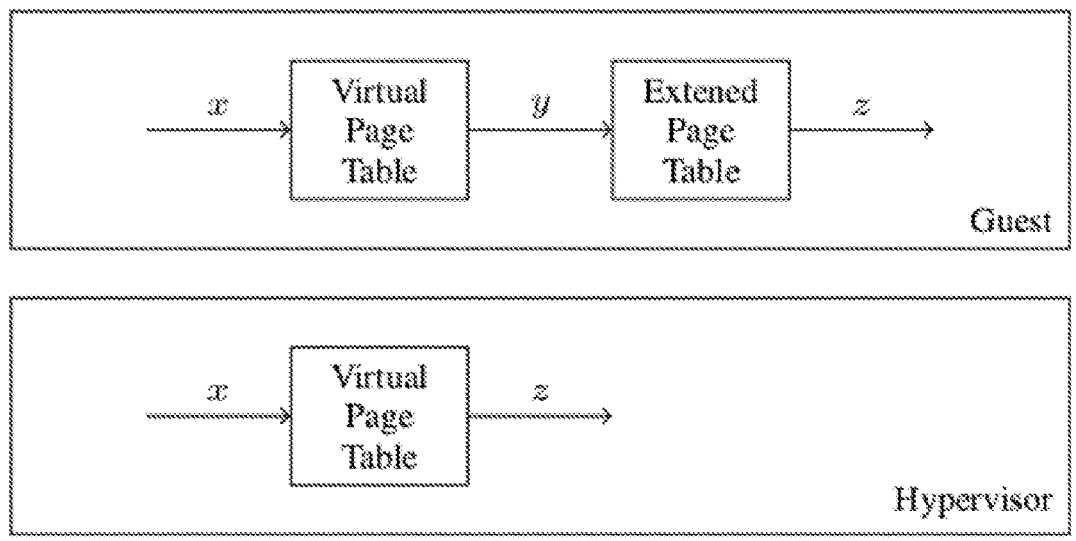
FIG. 11 is a block diagram schematically representing the Address translations in the guest and the hypervisor.

Referring now to FIG. 11, representing the Address translations in the guest and the hypervisor, when the guest accesses a virtual address x, it is translated to a guest physical address y via the guest's virtual page table, then y is translated to a real physical address z via EPT. When the hypervisor accesses a virtual address x, it is translated to a real physical address via hypervisor's virtual page table.

Secondary level address translation (SLAT), or extended page table (EPT), is a mechanism that allows hypervisors to control the mapping of physical page addresses as they are perceived by the operating system to the real physical addresses. In this sense, SLAT is similar to virtual page tables, a mechanism that allows the operating system to control the mapping of addresses as they are perceived by the process to the real physical addresses. When a process in a virtualized environment attempts to load a variable at (a virtual) address x, this address is first translated by the virtual page tables to a guest physical address y, then y is translated by EPT to a (real) physical address z (see FIG. 11). The virtual page table is configured by the operating system, while the EPT is configured by the hypervisor.

Input-output memory management unit (IOMMU) is an additional memory translation mechanism. In contrast to virtual page tables and EPT, IOMMU translates addresses that are accessed not by the processor but by hardware devices. Interestingly, the configuration tables of EPT and IOMMU are almost identical.

Protection from malicious access (reading and writing) to the hypervisor's code and data, as well as to the code of decrypted functions is carried out via a special and identical configuration of the EPT and IOMMU mapping. According to this configuration, all the sensitive memory regions are not mapped and are therefore inaccessible from the guest or from a hardware device. The EPT and IOMMU mapping provide the first two security guarantees.

It is noted that that since all the hypervisor's memory is allocated via a call to the UEFI memory allocation function, a regular non-malicious operating system will obey this allocation and will not attempt to access this memory region. However, only the EPT prevents the operating system from doing so.

Figures 12, 13:
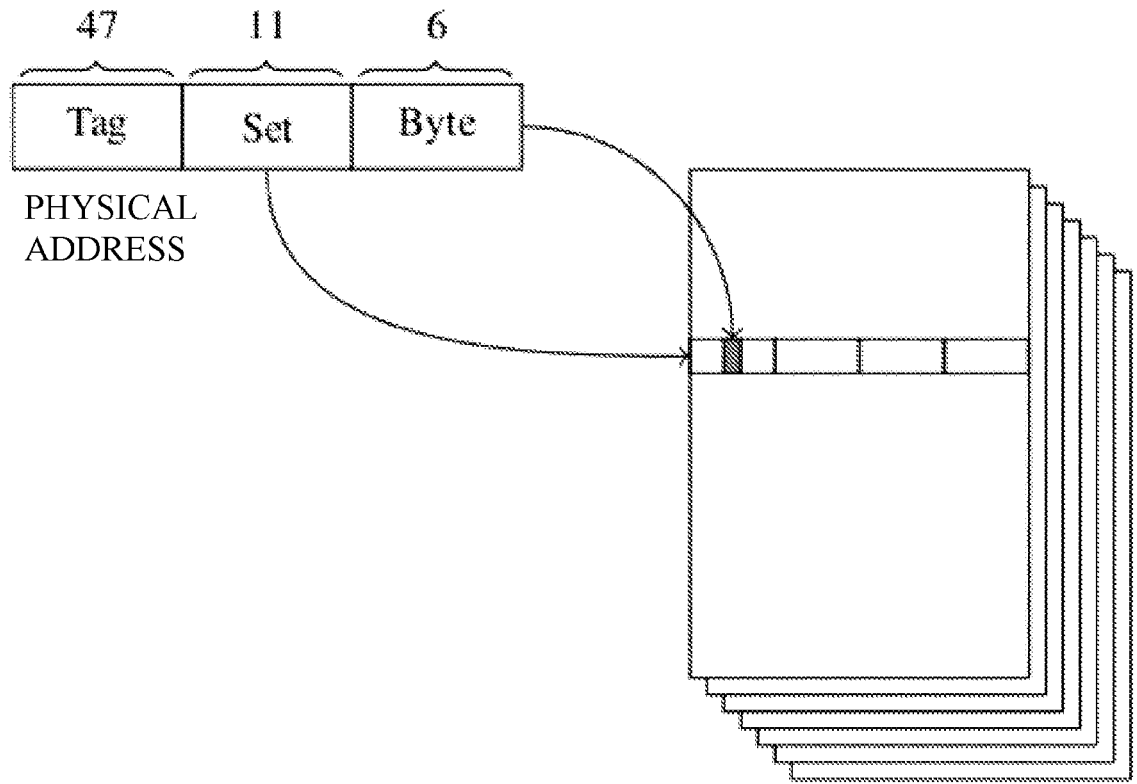
FIG. 12 is a schematic representation of an example of a last level cache organization.
FIG. 13 indicates a possible UEFI initialization algorithm for use in the method described herein.

Referring now to FIG. 12, schematically representing an example of a last level cache organization of associativity 4 with 6 slices and 2048 sets in each slice. The 6 least significant bits of the physical address select the byte in the cache line. The next 11 bytes select the set. The slice is determines by applying a hash function to the set and the tag fields of the physical address.

The third security guarantee, protection from bus sniffing, is much more challenging to achieve. We want to ensure that the sensitive data, the decryption key and the decrypted functions, are never transmitted over the bus. In other words, the sensitive data should reside in processors caches at all times.

Trusted Platform Module (TPM) is a standard that defines a hardware device with a non-volatile memory and pre-defined set of cryptographic functions. The device itself can be implemented as a standalone device mounted on the motherboard, or it can be embedded in the CPU packaging. Each TPM is equipped with a public/private key-pair that can be used to establish a secure communication channel between the CPU and the TPM. The non-volatile memory is generally used to store cryptographic keys. The processor of a TPM can decrypt data using a key stored in its memory without transmitting this key on the bus.

One of the main abilities of the TPM is environment integrity verification. The TPM contains a set of Platform Configuration Registers (PCRs) that contain (trustworthy) information about the current state of the environment. These registers can be read but cannot be assigned. The only way to modify the value of these registers is by calling a special function, Extend(D) that computes a hash of the given value D and the current value of the PCR, and sets the result as the new value of PCR. The UEFI firmware is responsible for initializing the PCRs and for extending them with the code of UEFI application before jumping to these applications. An application that wants to check its own integrity can compare the relevant PCR with a known value.

Another important ability of the TPM is symmetric cryptography. The TPM provides two functions: SEAL and UNSEAL. The first function encrypts a given plaintext and binds it to the current values of the PCRs. The second function decrypts the given ciphertext but only if the PCR values are the same as when the SEAL function was called.

Referring now to Algorithm 2, as presented in FIG. 13 presents the initialization sequence of our UEFI application. The application first checks whether a file named "key.bin" already exists (line 1). If so, its contents are read and unsealed producing a decryption key (line 2-3), which is then stored in a safe page. If, on the other hand, the "key.bin" file is missing, the application asks the user to type the key (line 5), which is then sealed and stored in a file (lines 6-7). In any case, the PCRs are extended with a (meaningless) value (line 9), thus preventing other UEFI applications and the operating system to unseal the contents of the "key.bin" file.

The UNSEAL function is executed by the TPM and its result is transmitted to the CPU over the bus. In order to protect the decryption key in the presence of a bus sniffer, our UEFI application establishes a secure communication channel (OIAP session). During the initialization of the channel, the application encrypts the messages using the public part of the key that is embedded in the TPM.

Evaluation

In order to evaluate the performance of the proposed system, the execution time of encrypted programs was measured. Each experiment evaluates a single program but with different sets of encrypted programs.

In the first experiment, the functions for encryption were selected randomly. The results show that the overhead increases moderately with a steep increase in the percentage of the encrypted functions. The purpose of this experiment is to demonstrate that the performance of the system does not depend on the percentage of encrypted functions but rather on the interactions between the functions.

The second experiment resembles the natural encryption process. Two functions were selected for encryption. Due to their interactions with other functions, severe performance degradation was observed. However the built-in profiler improved performance by encrypting additional functions. After several iterations an acceptable performance was achieved demonstrating the surprising result that initially poor performance can be improved to an acceptable level by encrypting additional functions.

Various system specifications, such as ARM8v-a for example, offer distinct user-space addresses and kernel-space addresses by the most significant bits (MSB). The MSB of kernel addresses are ones, while the MSB of user-space addresses are zeros. The specifications define user-space addresses as positive addresses and kernel-space addresses as negative addresses. The sizes of these MSB change by the address space size. The ARM8va hypervisor MMU uses positive addresses. Such characteristics make a hyplet possible. Accordingly, the microvisor can execute the user-space position independent code without intervention. Consider for example the following code snippet:

```
400610: foo:
400614: stp x16, x30, [sp,#-16]!
400618: adrp x16, 0x41161c
40061c: ldr x0, [sp,#8]
400620: add x16, x16, 0xba8
400624: br x17
400628: ret
```

This presents a common case of user-space addresses. The microvisor accesses relative addresses (adrp) and stacks (sp el0) and other properties without pre-processing. From the microvisor perspective, this snippet is a native code. From the user perspective, it is a user-space native code. In line 0x400624, the hyplet tries to access a non-mapped memory, and it aborts the process with an error and does not hog or crash the operating system.

The microvisor has its own address space. However, some of the hypervisor address spaces share some user-space address space. For example, 0x400000 might be used both by the microvisor and the user. For this, the microvisor is mapped to addresses that are not used by the user.

When interrupt latency improvement is required, the code may be migrated to the kernel or injected. However, a different approach would be to trigger a user-space event from the interrupt, but this would require an additional context switch. A context switch in most cases is time consuming and not suitable for realtime applications. Therefore, to make sure that the program code and data are always accessible, evacuation of the program's translation table from the processor is disabled. Therefore, the code and data is constantly accommodated in the hypervisor translation registers. In order to map a user-space program, the mappings infrastructure is configured to map a user-space code with kernel-space data.

Figure 14A:
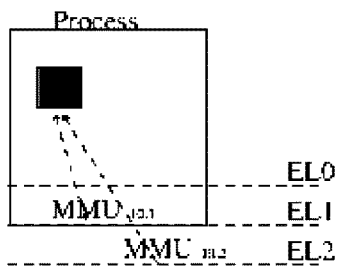
FIGS. 14A-C symbolically demonstrate various mappings of addresses to virtual addresses.

Referring to FIG. 14A demonstrating how identical addresses may be mapped to different virtual addresses in two separate exception levels. The dark shared section is part of EL2 and therefore accessible from EL2. However, when executing in EL2, EL1 data is not accessible without premature mapping to EL2. FIG. 14A presents the leverage of a Linux process from two exception levels to three.

Figure 14B:
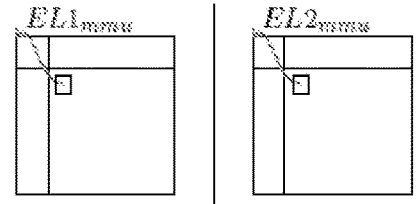

The natural way of memory mapping, depicted in FIG. 14B, is that EL1 is responsible for EL1/EL0 memory tables and EL2 is responsible for its own memory table, in the sense that each privileged exception level accesses its own memory tables.

Figure 14C:
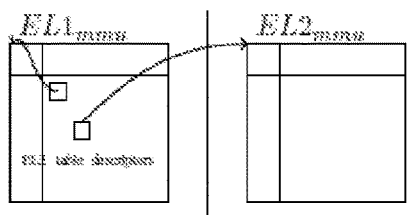

However, this would have put the microvisor at risk because it might overwrite or otherwise garble its own page tables. This hypervisor has a single memory address space. The architecture does not coerce an exception level to control its own memory tables, allowing the architecture to map the EL2 page table in EU, as FIG. 14C shows. Therefore, only EL1 can manipulate the microvisor page tables.

It is particularly noted that the hyplet may use multiple exception levels and escalates privilege levels. Nevertheless, using hyplets surprisingly does not damage application security.

It is particularly noted that on modern boards offering VHE extensions (such as ARMv8.2 architectures Cortex A-55 or Coretex A-75), the problem is solved using virtual host extension (VHE). With VHE, EL2 has an additional translation table that maps the kernel address space. In this manner, it is possible to execute the hyplet without endangering the hypervisor. VHE hardware is not available at the time of this writing, and as such, we are forced to use software measures to protect the hypervisor.

On older ARM boards, a security bug at hypervisor privilege levels may cause greater damage compared to a bug at the user process or kernel levels, thus posing system risk. The hyplet also escalates privilege levels from exception level 0 (user mode) or 1 (OS mode) to exception level 2 (hypervisor mode). Because the hyplet executes in EL2, it has access to EL2 and EL1 special registers. For example, the hyplet has access to the level 1 exception vector. Therefore, it would be expected that the hyplet comes with security costs on boards that do not include ARM VHE.

Surprisingly, however it has been found that this is not the case. In the case where no hypervisor is installed, the code in exception level 1 (OS) does not have lesser access than the code running in EL2 with only one OS running, as in the hyplet use case. Thus, the system is modified from the system that includes only EL0 and EL1 to the system that includes EL0, EL1, and EL2. As a result, the hyplet system moves a code that was running on EL1 without a hypervisor to EL2 with only one OS. This process gains no extra permission and running rogue code in EL1 is just as dangerous as doing the same within the hyplet system. Additionally, it is expected that the hyplet would be a signed code; otherwise, the hypervisor would not execute it. The hypervisor can maintain a key to verify the signature and ensure that the lower privilege level code cannot access the key. Furthermore, Real-time systems may eliminate even-user and kernel-mode separation for minor performance gains. Thus, escalating privileges for real performance and realtime capabilities may be acceptable on older hardware where hyplets might consist of a security risk.

Most memory (including EL1 and EL2 MMUs and the hypervisor page tables) is not mapped to the hypervisor. The non-sensitive part of the calling process memory is mapped to EL2. The hyplet does not map (and thus has no access to) kernel-space code or data. Thus, the hyplet does not pose a threat of unintentional corrupting kernel's data or any other user process unless additional memory is mapped or EL1 registers are accessed.

Thus, it is sufficient to detect and prevent access to EL1 and EL2 registers in order to prevent rogue code affecting the OS memory from the hypervisor. A static analyzer may access to EL1 and EL2 registers and filters any special commands (HVC).

The code analyzer scans the hyplet opcodes and checks that are no references to any black-listed registers or special commands. With the exception of the clock register and general purpose registers, any other registers are not allowed. If the hyplet uses libc's APIs then the libc does not violate security. The hyplet, in its secured mode, would prevent new mappings after the hyplet was scanned to prevent malicious code insertions. Another threat is the possibility of the insertion of a data pointer as its execution code (In the case of SIGBUS of SEGFAULT, the hyplet would abort and the process is killed). To prevent this the hyplet function pointer is checked to ensure that, when set, it is set in the executable section of the program.

Furthermore, in particular the ARM architecture features the TrustZone mode that can monitor EL1 and EL2. The TrustZone may be configured to trap illegal access attempts to special registers and prevent any malicious tampering of these registers. We have not implemented TrustZone level monitoring, but it can be implemented in real-world applications.

Hyplet—User-Space Interrupt

Figure 14D:
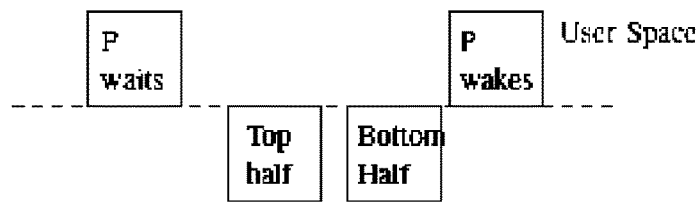
FIG. 14D-H are symbolic representations of various Hyplet User space interrupt procedures.

In Linux and other operating systems, when an interrupt reaches the processor, it triggers a path of code that serves the interrupt. Furthermore, in some cases, the interrupt ends up waking a pending process, as depicted in FIG. 14D.

Figure 14E:
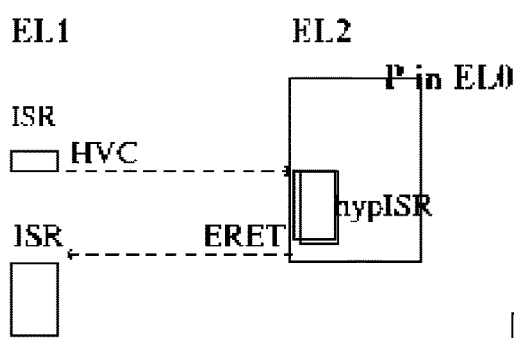

Interrupt latency is the time that elapses from the moment an interrupt is generated to the moment it is serviced. In the hyplet, the dual view of the program eliminates the penalty of a context switch to run user-space code and the top half and the bottom half of an interrupt. FIG. 14E depicts the hypISR flow.

Figure 14F:
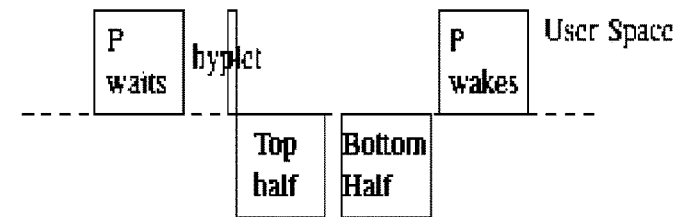

The hyplet reduces the time from the interrupt event to the program. To achieve this, as the interrupt reaches the processor, instead of executing the user program code in EL0 after the ISR (and sometimes after the bottom half), a special procedure of the program is executed in HYP mode at the start of the kernel's ISR. The hyplet does not change the processor state when it is in interrupt; thus, once the hyplet is served, the kernel interrupt can be processed. This concept is depicted in FIG. 14F.

The hyplet does not require any new threads. Because the hyplet is actually an ISR, it can be triggered in high frequencies. As a result, high-frequency userspace timers are available in small embedded devices.

Some ARMv8 platforms do not support complete virtualization of the interrupt controller (VGIC). Raspberry PI3, for example, does not support VGIC fully. As a consequence, ARM-KVM does not run on a Raspberry PI3. For this reason, the hyplet is a para-virtualization technology. Interrupts are then routed to the hypervisor by calling the hypervisor call (HVC) from the kernel main-interrupt routine.

The remote procedure call is a type of interprocess communication (IPC) in which parameters are transferred in the form of function arguments. The response is returned as the function return value. The RPC mechanism handles the parsing and handling of parameters and return values. In principle, RPC can be used locally as a form of IPC and remotely over TCP/IP network protocols. In this paper, we only consider the local case.

IPC in real-time systems is considered a latency challenge and thus is refrained from use in many cases. The solution many programmers use is to put most of the logic in a single process. This technique decreases the complexity but increases the program size and risks. In multicore computers, one reason for the latency penalty is because the receiver may not be running when the message is sent. Therefore, the processor needs to switch contexts. HypRPCs are intended to reduce this latency to the sub microsecond on average, and HypRPCs act as a temporary address-space extension to the sending program. HypRPCs are easy to use because there is no need for synchronization between the receiver and the sender. If the receiving program exits, then the API immediately returns an error. If the function needs to be replaced in real time, there is no need to notify the sending program; instead, the function in the hypervisor only needs to be replaced.

Figure 14G:
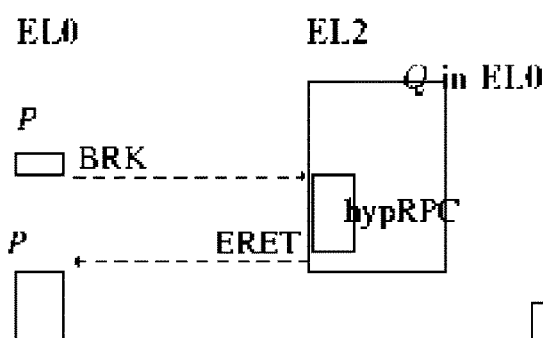
Figure 14H:
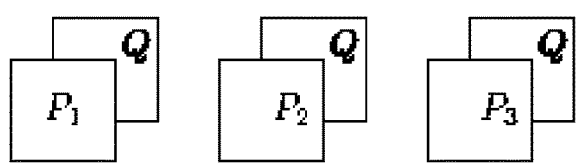

FIG. 14G demonstrates the hypRPC flow. Program P is a requesting program, and Q is a serving program. As program P loads, it defines itself as a hypRPC requesting program. A hypRPC program, unlike hypISR, is a program that traps into the HYP mode when it executes the BRK instruction. The tapping occurs because user-space programs are not permitted to perform the HVC instruction:

enter_hyp:
BRK
RET

When P calls enter hype, the first argument is the RPC id, i.e., x0=rpcid. As the processor executes BRK, it shifts to the HYP mode. Then, the hypervisor checks the correctness of the caller P and the availability of Process Q, and if all is ok, the hypervisor executes in EL2 the function with this ID.

Thus, program Q can be loaded on any processor, as a hypervised background program, and act as an auxiliary program for any program P at any time on the same processor. FIG. 14F shows a possible scenario in which the hypRPC is triggered whenever there is any P that needs a fast RPC.

As a side benefit, a hyplet RPC can also be considered a trusted execution environment, because the hyplet can be protected from modifications by keeping it encrypted.

Furthermore, it is further noted that there are other benefits of the hyplet described herein. These include safety, as the hypISR provides a safe execution environment for the interrupt. In Linux, if there is a violation while the processor is in kernel mode, the operating system may stop, and the kernel stops because it is considered unsafe. Thus, the kernel prints a log that describes the failure position and reason, and the system freezes. In the hyplet case, if there is a fault in the hypISR, the microvisor would trigger a violation (for instance, a SEGFAULT). The microvisor would send, through the kernel, a signal to the process containing the hyplet. This signal is possible because the fault entry of the microvisor handles the error as if it is a user-space error. For example, if a divide-by-zero failure happens, the operating system does not crash, but the hyplet capable-program exits with a SIGFPE. Another facet of hypISR is sensitive data protection, even from the operating system kernel. The hyplet can be used to securely access data, and I/O data may be hidden from EL1 and accessible only in EL2.

Moreover, the hyplet is scalable. Although the hyplet is part of a user-space program, it is not easy to have more than one hyplet-capable process on one processor. However, we can have several hyplets over the same interrupt in the same program. There is no restriction on the number of hyplets to use on any interrupt other than the time it takes the hyplet to complete execution. There are also no restrictions on the amount of memory the hyplet uses or on the stack size. Not having these restrictions is beneficial because the Linux kernel stack is restricted to 16 kilobytes and virtual memory is not abundant in the kernel mode.

The hyplet is also programming language independent. The only requirement is that the programming language is ELF binary regardless of the programming language. Similarly, the hyplet can be assigned to any interrupt, and all types of interrupts may be joined together to the hyplet. For example, the same hyplet may serve an input event from the USB subsystem and the video subsystem.

Moreover, it is possible to register different hyplets over different processors. Consequently, if an interrupt is assigned to more than one processor, then in order to trap it, we need to bind to each processor a hypletcapable program.

It is noted that the hyplet patch does not interfere with the hardcore of the kernel code, and the hyplet patch does not require any modification to any hardware driver. The modifications are in the generic ISR routine in a program exit, and we introduce a new system call: sys hyplet. As a result, it is easy to apply this system as it does not change the operating system heuristics. Microvisors, such as seL4 and Xvisor, are not easily applied on arbitrary hardware because they require a modified boot loader, making it impossible to apply the microvisors in some cases, for example, when the boot-loader code is closed. Jailhouse and KVM do not even run because virtualization hardware does not suffice (the GIC virtualization is incompatible) in some cases, and raspberry PI3 is an example of such virtualization hardware. RT PREEMPT is still not stable enough. For instance, while preparing this paper, we learned that applying the RT PREEMPT patch on raspberry PI3 is difficult. In Android OS, it is undesirable to apply RT PREEMPT because it changes the entire operating system behavior. In short, it is best to localize the changes as little as possible.

The hyplet is a part of a running program such as other Unix-like APIs, such as signals or sockets, and it may be removed and assigned dynamically while the hyplet process runs. If the process exits, the hyplet removes itself automatically from the hypervisor. Any data section or code section that is unmapped from the process, while the process runs, is also automatically unmapped from the hyplet if it is mapped to the hypervisor.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A method for protecting computer code comprising:
   obtaining an input file comprising code representing executable files including at least one vulnerable function selected to be encrypted;
   encrypting each said at least one vulnerable function;
   replacing an unencrypted version of each said at least one vulnerable function of the input file with a Virtual Machine exit (VM-exit) generating instruction, thereby generating a protected executable file;
   generating a database file including an encrypted version of each said at least one vulnerable function;
   storing a decryption key on a local memory of a target device, said decryption key characterized by being accessible to only a first requesting function;
   storing said database file on a local memory of said target device;
   executing a Unified Extensible Firmware Interface (UEFI) application on said target device:
   said Unified Extensible Firmware Interface (UEFI) application initializing a hypervisor;
   said hypervisor accessing said decryption key;
   said Unified Extensible Firmware Interface (UEFI) application loading an operating system of said target device;
   said operating system executing said executable files;
   said hypervisor detecting an attempt to execute said encrypted version of a vulnerable function;
   said hypervisor decrypting said encrypted version of said vulnerable function;
   said hypervisor protecting a decrypted version of said vulnerable function;
   said hypervisor executing said vulnerable function; and
   said hypervisor deleting said decrypted version of said vulnerable function,
   wherein the step of storing a decryption key on a local memory of said target device comprises encrypting said decryption key using a trusted platform module (TPM).

2. The method for protecting computer code of claim 1 wherein the step of said hypervisor accessing said decryption key comprises said TPM unsealing said decryption key.

3. The method for protecting computer code of claim 2 wherein the step of said TPM unsealing said decryption key further comprises said TPM transitioning to an inaccessible state such that the decryption key is indecipherable.

4. The method for protecting computer code of claim 1 further comprising said Unified Extensible Firmware Interface (UEFI) application communicating with said TPM over a secure channel.

5. A method for protecting computer code comprising:
   obtaining an input file comprising code representing executable files including at least one vulnerable function selected to be encrypted;
   encrypting each said at least one vulnerable function;
   replacing an unencrypted version of each said at least one vulnerable function of the input file with a Virtual Machine exit (VM-exit) generating instruction, thereby generating a protected executable file;
   generating a database file including an encrypted version of each said at least one vulnerable function;
   storing a decryption key on a local memory of a target device, said decryption key characterized by being accessible to only a first requesting function;
   storing said database file on a local memory of said target device;
   executing a Unified Extensible Firmware Interface (UEFI) application on said target device:
   said Unified Extensible Firmware Interface (UEFI) application initializing a hypervisor;
   said hypervisor accessing said decryption key;
   said Unified Extensible Firmware Interface (UEFI) application loading an operating system of said target device;
   said operating system executing said executable files;
   said hypervisor detecting an attempt to execute said encrypted version of a vulnerable function;
   said hypervisor decrypting said encrypted version of said vulnerable function;

said hypervisor protecting a decrypted version of said vulnerable function;

said hypervisor executing said vulnerable function; and said hypervisor deleting said decrypted version of said vulnerable function, wherein the step of executing said Unified Extensible Firmware Interface (UEFI) application on said target device comprises:

allocating at least one persistent memory block;

setting up secondary level address translation table mapping apparent operating system perceived addresses to real physical addresses; and setting up an input-output memory management unit mapping apparent hardware device perceived system addresses to real physical addresses.

6. The method for protecting computer code of claim 5 further comprising said secondary level address translation table mapping the hypervisor address space and the operating system address space to different groups of cache sets.

7. The method for protecting computer code of claim 5 further comprising said input-output memory management unit mapping the hypervisor address space and the operating system address space to different groups of cache sets.

8. The method for protecting computer code of claim 5 further comprising said secondary level address translation table assigning access rights to said real physical addresses.

9. The method for protecting computer code of claim 5 further comprising said input-output memory management unit assigning access rights to said real physical addresses.

10. The method for protecting computer code of claim 5 wherein said secondary level address translation table comprises an extended page table.

* * * * *